United States Patent [19]

Mehnert et al.

[11] Patent Number: 6,090,417

[45] Date of Patent: Jul. 18, 2000

[54] NUTRITIONAL FORTIFICATION OF NATURAL CHEESE AND METHOD OF MAKING

[75] Inventors: David W. Mehnert, Antioch; Lowell L. Isom, Evanston, both of Ill.

[73] Assignee: Kraft Foods, Inc., Northfield, Ky.

[21] Appl. No.: 09/275,471

[22] Filed: Mar. 24, 1999

[51] Int. Cl.$^7$ .................................................. A23C 19/09
[52] U.S. Cl. ................................. 426/72; 426/38; 426/42; 426/72; 426/73; 426/74; 426/89; 426/516; 426/518; 426/519; 426/522; 426/582; 426/654
[58] Field of Search .............................. 426/582, 89, 516, 426/518, 519, 522, 72, 73, 74, 654, 38, 42, 43

[56] References Cited

U.S. PATENT DOCUMENTS

| | | | |
|---|---|---|---|
| 3,562,910 | 2/1971 | Runge et al. ................................. 31/89 |
| 3,975,544 | 8/1976 | Kosikosky ................................ 426/582 |
| 4,039,695 | 8/1977 | Johnson .................................... 426/582 |
| 4,600,706 | 7/1986 | Carter ......................................... 514/31 |
| 5,902,625 | 5/1999 | Barz et al. ................................ 426/582 |

FOREIGN PATENT DOCUMENTS 1752323  5/1992  U.S.S.R.

*Primary Examiner*—Helen Pratt
*Attorney, Agent, or Firm*—Fitch, Even, Tabin & Flannery

[57] ABSTRACT

The present invention provides a method of making flavorful, organoleptically pleasing natural cheese containing a nutritional supplement. In important embodiments of the method the nutritional supplement includes vitamins, minerals, antioxidants, probiotics, botanicals, and mixtures thereof, and the natural cheese may be Cheddar cheese, Colby cheese, Monterey Jack, Havarti cheese, Muenster cheese, Brick cheese, Gouda cheese, and mixtures thereof.

13 Claims, No Drawings

NUTRITIONAL FORTIFICATION OF NATURAL CHEESE AND METHOD OF MAKING

FIELD OF THE INVENTION

This invention relates to a method of fortifying natural cheeses with a nutritional supplement. The method avoids the production of off flavors and the deterioration of the organoleptically pleasing qualities of the cheese.

BACKGROUND OF THE INVENTION

It is generally an objective of food products manufactured for public consumption to enhance their nutritional properties. Nutritional fortification of cheese products may include supplementation with trace requirements or additives that benefit the overall state of health of the human body. Examples of nutritional fortification include supplementation by vitamins, minerals, and comparable materials. These supplements are either absolutely essential for human metabolism or enhance the provision of substances that may not be available in sufficient amounts in a normal diet.

Currently known methods for supplementing cheese products with nutritional additives generally involve providing the supplement to the fermenting dairy composition. Although such a method will provide the nutrients in question to the final cheese product, they may affect the fermentation process, often in an undesirable and/or unpredictable manner. Various microorganisms are used to curdle the milk and to provide the particular flavor of the chosen cheese variety. These microorganisms, however, may respond to the presence of the nutritional supplements by growing at an excessive rate, or by undergoing induction of metabolic pathways that otherwise are quiescent and not active. In addition, the presence of the nutritional supplements may enhance the growth of adventitious microbiological contaminants in the culture. Thus, in the presence of nutritional supplements, fermentation or other products may be produced which adversely affect sensory qualities, texture, mouthfeel, or other properties.

Moreover, the presence of such nutritional supplements may also affect the ability of the manufacturer to use or reuse "trim." During the manufacture of natural cheeses, trim cheese (e.g., over- or underweight pieces, edge trim, and the like) is often used to make process cheese. Trim containing nutritional supplements will often not be suitable for preparing process cheese. Unusable trim material would have to be discarded or otherwise disposed of in an environmentally acceptable manner. Such waste would increase the cost to the manufacturer and, ultimately, to the consumer.

For these reasons there remains a need for methods that introduce nutritional supplements into cheese products while providing cheeses that retain their flavor, texture, and mouthfeel. There further remains a need to provide cheese products fortified with any of a broad range of nutritional supplements. There further remains a need for a process of preparing nutritionally enhanced cheese which does not adversely affect the use of trim in process cheese. The present invention fulfils these needs.

SUMMARY OF THE INVENTION

The present invention provides a method of making flavorful, organoleptically pleasing natural cheese containing one or more nutritional supplements. The method includes the steps of:

(1) shredding a natural cheese to form pieces whose general size is effective to receive the nutritional supplement;

(2) adding a nutritional supplement to the shredded cheese to form a mixture;

(3) blending the mixture to achieve an essentially homogenous mixture; and (4) compressing the essentially homogenous blended mixture to form the natural cheese containing the nutritional supplement.

Also provided is a flavorful, organoleptically pleasing natural cheese containing a nutritional supplement, said natural cheese prepared by method comprising the steps of:

(1) shredding a natural cheese to form pieces whose general size is effective to receive the nutritional supplement;

(2) adding a nutritional supplement to the shredded cheese to form a mixture;

(3) blending the mixture to achieve an essentially homogenous mixture; and (4) compressing the essentially homogenous blended mixture to form the natural cheese containing the nutritional supplement.

In important embodiments of the method, the nutritional supplement also includes vitamins, minerals, antioxidants, probiotics, botanicals, and mixtures thereof. Suitable vitamins include, for example, vitamin A, vitamin C, vitamin D, vitamin E, B vitamins, niacin, folate, folic acid, and the like as well as mixtures thereof. Suitable minerals include, for example, salts of metal nutrients, wherein the metals are chosen from among calcium, magnesium, copper, iron, zinc, chromium, and the like as wells as mixtures thereof; salts of inorganic minerals such as, for example, phosphate, sulfate, chloride, and the like as well as mixtures thereof can also be used. Suitable antioxidants include, for example propyl gallate, octyl gallate, dodecyl gallate, butylated hydroxyanisole, butylated hydroxytoluene, and the like as well as mixtures thereof. Suitable probiotics include, for example Acidophilus Bifidobacterium, Lacotbacilus Johnsonii, and the like as well as mixtures thereof. Suitable botanicals include, for example St. John wort, ginseng, ginkgo bibba, and the like as well as mixtures thereof. Of course, as those skilled in the art will realize, other vitamins, minerals, antioxidants, probiotics, and botanticals can also be used in the present invention. In additional embodiments, the natural cheese is chosen from among Cheddar cheese, Colby cheese, Monterey jack, Havarti cheese, Muenster cheese, Brick cheese, Gouda cheese, and mixtures thereof.

DETAILED DESCRIPTION OF THE INVENTION

The present invention provides a method of making a flavorful, organoleptically pleasing natural cheese containing a nutritional supplement. In this method, the nutritional supplement is added to a natural cheese after it has been curded and fermented with flavor-providing cultures.

The natural cheeses employed in the method may be derived from the treatment of any dairy liquid that provides cheese curds upon renneting. Such liquids include whole milk, reduced fat milk, skim milk, and any such milk further containing added dairy fractions. Such dairy fractions may be chosen by way of nonlimiting example from cream fractions, concentrated milk fractions obtained for example by evaporation, diafiltration and/or ultrafiltration of milk, and comparably treated dairy liquids. The dairy liquid employed in the cheese making fermentation may further contain dried solid components of milk fractions, such as non fat dry milk, cream solids, and the like.

The dairy liquid so provided is subjected to a conventional cheese making process. The cheese may be produced by treatment with a rennet, a cheesemaking culture, or a combination thereof. When a cheesemaking culture is employed, the identity of the resulting cheese, and its characteristic flavor, texture and mouthfeel are governed by the particular culture chosen for the fermentation. In this way, a broad range of natural cheeses may be produced for use in the present invention. These cheeses include, by way of nonlimiting example, Cheddar cheese, Colby cheese, Monterey Jack, Havarti cheese, Muenster cheese, Brick cheese, Gouda cheese, and the like. Mixtures of such cheeses may also be used.

The natural cheese is then fragmented or shredded to pieces whose sizes are appropriate for receiving the nutritional supplement. The pieces should also be appropriate in size for subsequent compaction to form a cake of fortified cheese that may be packaged for sale. In general, cheese fragments used in the present invention may be regular or irregular sized particles. For shredded pieces, the particles are preferably about $1/32$ to about $5/8$ inches in diameter and about 1 to about 5 inches in length; more preferably, they are about $1/16$ inch in diameter and about 2 to 3 inches in length. For more circular pieces, the particles are preferably about $1/2$ to about 1 inch in diameter; more preferably, they are about $3/4$ inch in diameter. Of course, other shaped particles having similar dimensions to those just discussed can be used in the practice of this invention. Such cheese particles or fragments generally weigh from about $1/50$th of an ounce to about 1–2 ounces. The size of the fragments is appropriate to receive the nutritional supplement if, after adding the supplement, the mixture may be blended to distribute the supplement essentially uniformly throughout the blended mixture.

A composition comprising the nutritional supplement is added to the shredded or fragmented cheese. The composition may be a solid blend of the nutritional compounds, or it may be a suspension or solution of the nutrient compounds in a liquid. The liquid may be an aqueous composition or an organic liquid such as a fat or oil, or a volatile edible solvent such as ethanol. Nutrients contained in the supplement generally are trace nutrients that are either required for metabolism of the cells of the human body, or they may be substances which are available at moderate levels in ordinary foodstuffs but which may be supplemented by inclusion in the nutritional supplement of the invention. As used herein, a "trace" nutrient is any nutrient whose total daily required intake for an adult human is less than about 1–2 gram, or in many cases, less than about 100 mg, or even in certain cases less than 10 mg, or less than 1 mg. The composition may further contain inert and nutritionally innocuous extenders or excipients whose presence helps achieve a uniform distribution of the nutritionally active compounds in the supplement composition, once added to the cheese, throughout the blended mixture.

The nutrient compounds included in the nutritional supplements of the invention include, for example, vitamins, minerals, antioxidants, probiotics, botanicals, and mixtures thereof. Suitable vitamins include, for example, vitamin A, vitamin C, vitamin D, vitamin E, B vitamins, niacin, folate, folic acid, and the like as well as mixtures thereof. Suitable minerals include, for example, salts of metal nutrients, wherein the metals are chosen from among calcium, magnesium, copper, iron, zinc, chromium, and the like as wells as mixtures thereof; salts of inorganic minerals such as, for example, phosphate, sulfate, chloride, and the like as well as mixtures thereof can also be used. Suitable antioxidants include, for example propyl gallate, octyl gallate, dodecyl gallate, butylated hydroxyanisole, butylated hydroxytoluene, and the like as well as mixtures thereof. Suitable probiotics include, for example Acidophilus Bifidobacterium, Lacotbacilus Johnsonii, and the like as well as mixtures thereof. Suitable botanicals include, for example St. John wort, ginseng, ginkgo bibba, and the like as well as mixtures thereof. Of course, as those skilled in the art will realize, other vitamins, minerals, antioxidants, probiotics, and botanticals can also be used in the present invention.

The amount of nutritional supplements added will, of course, vary considerably depending on the specific nutrient or mineral added (and its recommended daily requirement) and the targeted consumer. For example, macronuterients (e.g., calcium) can be added at relatively high levels (i.e., up to about 5 percent) whereas other trace minerals, vitamins, and other additives (i.e., generally materials having daily adult requirements in the milligram range or lower) will normally be added at much lower levels. It is generally suggested that such additives be incorporated such that a single serving size of the fortified cheese will provide about 10 to about 100 percent of the recommended daily requirement. As those skilled in the art will realize, lower or higher amounts can also be used taking into account the nutritional requirements of consumers.

One especially preferred nutritional supplement for use in the present invention is calcium. Suitable forms of calcium include, for example, calcium sulfate, calcium chloride, monocalcium phosphate, tricalcium phosphate, calcium fumerate, calcium gluconate, calcium carbonate, and the like as well as mixtures thereof. As demonstrated in Examples 2 and 3, a calcium-fortified cheese, which can provide half, or even, more of the daily minimum requirement (about 0.5 to about 1 g/day for an adult) in a single slice, can be prepared while maintaining excellent organoleptic properties. An especially preferred nutritional supplement mixture for use in this invention includes calcium and natamycin (a mold inhibitor). Generally, the final cheese product supplemented with such a mixture will contain about 3 to about 5 weight percent calcium and about 1 to 1.5 percent natamycin. Of course, smaller or larger amounts can be used if desired.

In operation, the nutritional supplement composition can be added to the cheese shreds or fragments in, for example, a tumble drum mixer. A liquid nutritional composition may be added, for example, using a sprayer or an atomizer, or it may be added dropwise from a nozzle. For liquid nutritional compositions, the concentration of the nutritional additives will generally vary depending on the number of and the actual nutritional additives included. A solid nutritional composition may be added as a particulate mixture or blend of the components using conventional devices that can a uniform rate of the composition. For solid nutritional compositions, the particle size is generally in the range of about 5 to about 50 microns. Of course, other methods of introducing the supplements can be used so long as they can be effectively distributed over the surfaces of the cheese shreds or particles. The drum revolves slowly such that the cheese fragments and the nutritional supplement are blended together in a uniform fashion. Of course, other types of mixer can be used if desired; such mixers include, for example, single screw augers, V-blenders, and the like.

Once blended, the cheese fragments fortified with the nutritional supplement are compacted to form solid pieces of nutritionally supplemented cheese. Suitable equipment for compaction includes, for example, presses, extruders, compactors, pumps, and the like. Examples of apparatus useful for compacting cheese fragments are disclosed, for example, in U.S. Pat. No. 3,562,910 and in U.S. Pat. No.

4,039,695, which are incorporated herein by reference. The compacted cheese-supplement blend is preferably extruded from the compacting apparatus in the form of a continuous strip whose cross section is determined by a die at the effluent point of the apparatus. The strip can then be cut into individual pieces, shapes, blocks, or the like for packaging, shipment, and sale. Preferably the extrusion step is carried out without significant shear on the extruded cheese product. In some cases, it may be desirably and preferably to extrude at an elevated temperature (i.e., an extrusion head temperature of about 65 to 95° F.); the cheese tempeature is preferably maintained at about 35 to about 65° F. Using an extrusion die coated with Teflon™ or other low friction material is generally preferred.

Thus, this invention provides a process whereby the supplements are only added after the natural cheese has been manufactured. Thus, the supplements cannot interfere with the fermentation and/or flavor development steps. In addition, any trim generated in the process before the supplement blending step can be reused in making process cheese without interference by the supplements. The supplements are only added after the natural cheese has been shredded or otherwise reduce to relatively small particles. The supplements and natural cheese particles are then blending so as to obtain an essentially homogenous mixture of cheese particles coated with the supplements. The coated cheese particles are then extruded into the desired shapes, thereby further mixing or blending the supplements throughout the cheese blocks or strips. The resulting cheese can then be cut to the desired size and/or shape for the retail or other market.

The following examples are intended to illustrate the invention and not to limit it. Unless otherwise noted, all percentages are by weight.

EXAMPLE 1

Fully cured Sharp Cheddar cheese is to be shredded, sliced, cubed or chunked into pieces individually weighing less than 1 oz. The cheese is to be tumbled in a 6 ft. stainless steel tumble drum angled at about 5 degrees and rotating at approximately 9 RPM. Approximately 15 pounds of the cheese pieces are added to the drum. The soluble nutritional supplement—vitamin D (0.1 g) in 136 ml water—was added. The cheese, with the blended nutrients, is then to be transferred into the fill funnel of a V-mag type sausage stuffer or a stuffer with sufficient power to force the mixture through a partially restricted orifice with a 2 in by 2 in outlet. The force exerted on the mixture compacts the blend into a solid mass without significant product shear. The solid mass exiting the stuffer is continuous and has a profile which is 2 in by 2 in square. Single cuts perpendicular to the formed sides are to be made to form chunks ready for packaging. The individual chunks are to be packaged in an oxygen-free package and stored at 35° F. to 45° F.

EXAMPLE 2

Shredded natural cheese is to be prepared via the Urschel dicer (Urschel, Valparaiso, Indiana) with knives and controls set for the production of particulate cheese with dimensions of 1/16 in×1/16 in×2–3 in. The particulation process is to take place at temperatures between 35° F. to 45° F. The particulates are to be subjected to dry calcium via a 6 ft. stainless steel tumble drum with a dry powder dispenser and a Spray Dynamics Liquid Applicator system (St. Louis, Mo.) attached. Calcium is to be added such that its final concentration is 3–5% of the final product weight, or about 400 mg per 30 g of cheese, and natamycin is to be added such that its concentration is 1.2% of the final product weight. The cheese may be fortified with additional nutrients such as vitamins A, B, D, C, and E during the dry calcium application step. Generally, such vitamins are added as a solid powder in an amount of about 400 mg per 30 g cheese. Of course, such nutrients could be added at lower or higher amounts if desired.

The particulate cheese blended with dry calcium and natamycin is to be continuously loaded into a VF50 vacuum filler (Handtmann, Inc., Buffalo Grove, Ill.). The filling speed is adjusted to obtained the desired cheese texture. The end product shape will be dependent on the size and shape of the extrusion fitting attached to the Handtmann vacuum filler. The extrusion head is to be a 316SS jacketed fitting coated with Teflon to reduce product surface fracture. During extrusion, the jacket temperature is to be maintained between 65° F. and 95° F., and preferably between 65° F. and 95° F. for optimal manufacturability; using these settings, the temperature of the extruded or compacted cheese will generally be in the range of about 35° F. and 65° F. (i.e., "cold compaction"). An automated wire cutting wheel is to be set to cut the desired chunk size or chunk weight of cheese as it exits the extrusion head. Chunks are to be passed through metal detection, subjected to application of a solution of natamycin (a mold inhibitor), and are to be flushed with carbon dioxide and nitrogen prior to sealing and case packing.

EXAMPLE 3

A calcium-fortified, 2% milk reduced fat mild cheddar cheese was prepared using the procedure as essentially described in Example 2. Sufficient calcium (about 280 g per 15 pounds cheese), in the form of calcium sulfate dihydrate, was added to provide approximately 50 percent of the daily recommended requirement of calcium in a single one-ounce serving. Samples of the calcium-fortified and a similar (but non-fortified) natural cheese were presented to 150 consumers in a blinded taste test. Using a scale of 1–9 (with 1 being low preference and 9 being high preference), the calcium-fortified cheddar had an overall score of about 7.1 to about 7.3; a similar but not fortified cheddar had an overall score of about 6.5 to 7.5. The test took into account appearance, flavor, and texture.

We claim:

1. A method of making flavorful, organoleptically pleasing natural cheese containing a nutritional supplement, said method comprising the steps of:
   (1) shredding a natural cheese to form pieces whose general size is effective to receive the nutritional supplement;
   (2) adding a nutritional supplement to the shredded cheese to form a mixture;
   (3) blending the mixture to achieve an essentially homogenous mixture; and
   (4) compressing the essentially homogenous blended mixture to form the natural cheese containing the nutritional supplement,
   wherein the nutritional supplement comprises vitamins, minerals, antioxidants, probiotics, botanicals, and mixtures thereof, and
   wherein the nutritional supplement comprises vitamins chosen from the group consisting of vitamin A, vitamin C, vitamin D, vitamin E, B vitamins, niacin, folate, folic acid, and mixtures thereof.

2. The method as defined in claim 1, wherein temperature of the essentially homogenous blended mixture is about 35 to about 65° F. during compressing.

3. The method as defined in claim 2, where the natural cheese containing the nutritional supplement from step (4) is cut to form individual cheese shapes which are then wrapped.

4. The method as defined in claim 2, wherein the nutritional supplement comprises minerals selected from the group of salts of metal nutrients and salts of inorganic nutrients, and wherein when the nutritional supplement comprises salts of metal nutrients, the metal is selected from the group consisting of calcium, magnesium, copper, iron, zinc, chromium, and mixtures thereof.

5. The method as defined in claim 1, where the natural cheese containing the nutritional supplement from step (4) is cut to form individual cheese shapes which are then wrapped.

6. The method as defined in claim 5 wherein the nutritional supplement comprises minerals selected from the group of salts of metal nutrients and salts of inorganic nutrients, and wherein the nutritional supplement comprises salts of metal nutrients, the metal is selected from the group consisting of calcium, magnesium, copper, iron, zinc, chromium, and mixtures thereof.

7. The method as defined in claim 1, wherein the nutritional supplement comprises vitamins, minerals, antioxidants, probiotics, botanicals, and mixtures thereof, wherein the nutritional supplement comprises minerals selected from the group of salts of metal nutrients and salts of inorganic nutrients, and wherein the metal is selected from the group consisting of calcium, magnesium, copper, iron, zinc, chromium and mixtures thereof.

8. A flavorful, organoleptically pleasing natural cheese containing a nutritional supplement, said natural cheese prepared by method comprising the steps of:

(1) shredding a natural cheese to form pieces whose general size is effective to receive the nutritional supplement;

(2) adding a nutritional supplement to the shredded cheese to form a mixture;

(3) blending the mixture to achieve an essentially homogenous mixture; and (4) compressing the essentially homogenous blended mixture to form the natural cheese containing the nutritional supplement, wherein the nutritional supplement comprises calcium and natamycin.

9. The natural cheese as defined in claim 8, where the natural cheese containing the nutritional supplement from step (4) is cut to form individual cheese shapes which are then wrapped.

10. The natural cheese as defined in claim 9, wherein the nutritional supplement comprises vitamins, minerals, antioxidants, probiotics, botanicals, and mixtures thereof.

11. The natural cheese defined in claim 8, wherein the temperature of the essentially homogenous blended mixture is about 35 to about 65° F. during compressing.

12. The natural cheese as defined in claim 11, wherein the nutritional supplement comprises vitamins, minerals, antioxidants, probiotics, botanicals, and mixtures thereof.

13. The natural cheese defined in claim 8, wherein the nutritional supplement comprises vitamins, minerals, antioxidants, probiotics, botanicals, and mixtures thereof.

* * * * *

UNITED STATES PATENT AND TRADEMARK OFFICE
CERTIFICATE OF CORRECTION

PATENT NO. : 6,090,417
DATED : July 18, 2000
INVENTOR(S) : Mehnert et al.

It is certified that error appears in the above-identified patent and that said Letters Patent is hereby corrected as shown below:

Cover Page, change "Northfield, KY" to --Northfield, IL--

Signed and Sealed this

Twenty-second Day of May, 2001

Attest:

NICHOLAS P. GODICI

*Attesting Officer*    *Acting Director of the United States Patent and Trademark Office*